(12) United States Patent
Miura (10) Patent No.: US 8,676,483 B2
(45) Date of Patent: Mar. 18, 2014

(54) GUIDANCE CONTROL DEVICE, GUIDANCE CONTROL METHOD, AND GUIDANCE CONTROL PROGRAM

(75) Inventor: Naoki Miura, Toyokawa (JP)

(73) Assignee: Aisin AW Co., Ltd., Anjo (JP)

( * ) Notice: Subject to any disclaimer, the term of this patent is extended or adjusted under 35 U.S.C. 154(b) by 694 days.

(21) Appl. No.: 12/938,693

(22) Filed: Nov. 3, 2010

(65) Prior Publication Data

US 2011/0106368 A1 May 5, 2011

(30) Foreign Application Priority Data

Nov. 4, 2009 (JP) .................................. 2009-253247

(51) Int. Cl.
*G07C 5/08* (2006.01)
*B60K 31/00* (2006.01)

(52) U.S. Cl.
USPC .................. 701/123; 701/51; 701/64; 701/65

(58) Field of Classification Search
None
See application file for complete search history.

(56) References Cited

U.S. PATENT DOCUMENTS

| 5,287,773 | A * | 2/1994 | Nakawaki et al. ............... 477/92 |
| 6,434,472 | B1 | 8/2002 | Minowa et al. |
| 7,072,762 | B2 * | 7/2006 | Minami et al. ................. 701/123 |
| 7,765,039 | B1 * | 7/2010 | Hagenbuch .................... 701/32.2 |
| 7,772,970 | B2 * | 8/2010 | Masuda et al. ................. 340/439 |
| 2003/0216847 | A1 | 11/2003 | Bellinger |
| 2007/0270279 | A1 * | 11/2007 | Saitoh et al. .................. 477/110 |
| 2007/0276582 | A1 * | 11/2007 | Coughlin ....................... 701/123 |
| 2009/0112386 | A1 * | 4/2009 | Saitoh et al. .................... 701/22 |
| 2009/0171542 | A1 * | 7/2009 | Sugiura et al. .................. 701/52 |
| 2009/0251304 | A1 * | 10/2009 | Saito et al. ..................... 340/441 |
| 2010/0073158 | A1 * | 3/2010 | Uesaka et al. ............... 340/450.2 |
| 2010/0259374 | A1 * | 10/2010 | Matsuo et al. ................. 340/439 |
| 2011/0125357 | A1 * | 5/2011 | Harumoto et al. .............. 701/22 |
| 2011/0137512 | A1 * | 6/2011 | Harumoto et al. .............. 701/29 |

FOREIGN PATENT DOCUMENTS

| JP | A-10-148255 | 6/1998 |
| JP | A-2000-242888 | 9/2000 |
| JP | 2008157081 A * | 7/2008 |
| JP | A-2008-247317 | 10/2008 |
| JP | A-2009-002413 | 1/2009 |

OTHER PUBLICATIONS

Mar. 1, 2011 European Search Report issued in EP 10 18 9988.
Japanese Patent Office, Notification of Reason(s) for Refusal mailed Jul. 10, 2013 in Japanese Patent Application No. 2009-253247 w/Partial English-language Translation.

* cited by examiner

*Primary Examiner* — Khoi Tran
*Assistant Examiner* — Ryan Rink
(74) *Attorney, Agent, or Firm* — Oliff PLC (57) ABSTRACT

Guidance control device, methods and programs control an in-vehicle apparatus of a vehicle. The devices, methods, and programs access vehicle state information that specifies a state of the vehicle and determine whether a vehicle state condition is established based on the accessed vehicle state information. The devices, methods, and programs access driving environment information that specifies a driving environment of the vehicle and determine whether a driving environment condition is established based on the accessed driving environment information. The devices, methods, and programs generate guidance based on whether the vehicle state condition is established and whether the driving environment condition is established and cause the generated guidance to be output on a display.

13 Claims, 7 Drawing Sheets

GUIDANCE CONTROL DEVICE, GUIDANCE CONTROL METHOD, AND GUIDANCE CONTROL PROGRAM

INCORPORATION BY REFERENCE

The disclosure of Japanese Patent Application No. 2009-253247 filed on Nov. 4, 2009, including the specification, drawings and abstract is incorporated herein by reference in its entirety.

BACKGROUND

1. Related Technical Fields

Related technical fields include guidance control devices, a guidance control methods, and a guidance control programs.

2. Related Art

Vehicle control devices have been used in recent years to perform controls of in-vehicle apparatuses in a vehicle. For example, a vehicle control device has been proposed that controls an automatic transmission of the vehicle based on a driving environment of the vehicle (see Japanese Patent Application Publication No. JP-A-H10-148255, for example). With this device, an optimal speed ratio when passing through nodes on a road is determined based on road information read from a navigation processing unit. Using the detection of a deceleration operation by the driver as a condition, the speed ratio to be selected by the automatic transmission is set within a predetermined range. Further, the flashing of an indicator lamp is used to notify the driver that, through the detection of a deceleration operation, a shift control to achieve the optimal speed ratio can be executed. Another vehicle control device used determines whether the vehicle is traveling on a downhill road based on a vehicle state such as the vehicle acceleration or deceleration and the accelerator operation amount, and performs a downward slope control that changes a shift characteristic of the automatic transmission depending on the determination result.

SUMMARY

In the device according to the related art of JP-A-H10-148255, guidance is only provided to notify that the shift control can be executed based simply on the driving environment, which includes road information and the like. Therefore, when the shift control is actually executed, it is not possible to provide guidance that enables the driver to know whether the shift control is a downward slope control executed based on the vehicle's own state or a control executed based on the driving environment, such as road information and the like.

Exemplary implementations of the broad inventive principles described herein address the above disadvantage, and provides a guidance control device, a guidance control method, and a guidance control program, which can perform an output control of guidance related to a control of an in-vehicle apparatus such that the driver can know what information the control of the in-vehicle apparatus is executed based on.

According to exemplary implementations, when a control of an in-vehicle apparatus is performed, an output control of guidance is performed based on whether a vehicle state condition determination unit determines establishment of a vehicle state condition and whether a driving environment condition determination unit determines establishment of a driving environment condition. Therefore, it is possible to perform an output control of guidance related to the control of the in-vehicle apparatus such that the driver can know what information the control of the in-vehicle apparatus is executed based on.

According to exemplary implementations, in a case where the vehicle state condition determination unit determines that the vehicle state condition is not established and the driving environment condition determination unit determines that the driving environment condition is established, if the control of the in-vehicle apparatus is performed following establishment of the driving environment condition, an output control is performed of guidance to the effect that the control of the in-vehicle apparatus is performed based on establishment of the driving environment condition. Therefore, it is possible to perform an output control of guidance related to the control of the in-vehicle apparatus such that the driver can easily know that the control of the in-vehicle apparatus is performed based on establishment of the driving environment condition.

According to exemplary implementations, an output control is performed of guidance related to a fuel consumption of a vehicle in a predetermined travel segment; and a tentative fuel consumption of the vehicle that, when a shift control is not performed and the driving environment condition is established in the travel segment, assumes the shift control is performed based on whether the driving environment condition is established in the travel segment. Therefore, it is possible to perform an output control of guidance such that a fuel conservation effect assuming the shift control is performed based on whether the driving environment condition is established can be more clearly recognizable.

According to exemplary implementations, an output control is performed of guidance related to the fuel consumption of the vehicle in the predetermined travel segment; and the tentative fuel consumption of the vehicle that, when the shift control is performed due to establishment of only the driving environment condition in the travel segment, assumes the shift control is not performed in the travel segment. Therefore, it is possible to perform an output control of guidance such that a fuel conservation effect due to actually performing the shift control based on whether the driving environment condition is established can be more clearly recognizable.

According to exemplary implementations, driving environment information includes position information that specifies a current position of the vehicle, and road information that specifies a shape of a road. Therefore, it is possible to perform an output control of guidance related to the control of the in-vehicle apparatus such that the driver can know that the control of the in-vehicle apparatus is executed based on the position information and the road information.

BRIEF DESCRIPTION OF THE DRAWINGS

FIGS. 7A and 7B are drawings that illustrate a display that outputs guidance based on an output control of a guidance control unit, wherein

DETAILED DESCRIPTION OF EXEMPLARY IMPLEMENTATIONS

Hereinafter, an example of a guidance control device, a guidance control method, and a guidance control program will be described in detail with reference to the drawings. However, the scope of the present invention is not limited to such an example.

I. Constitution

Figure 1:
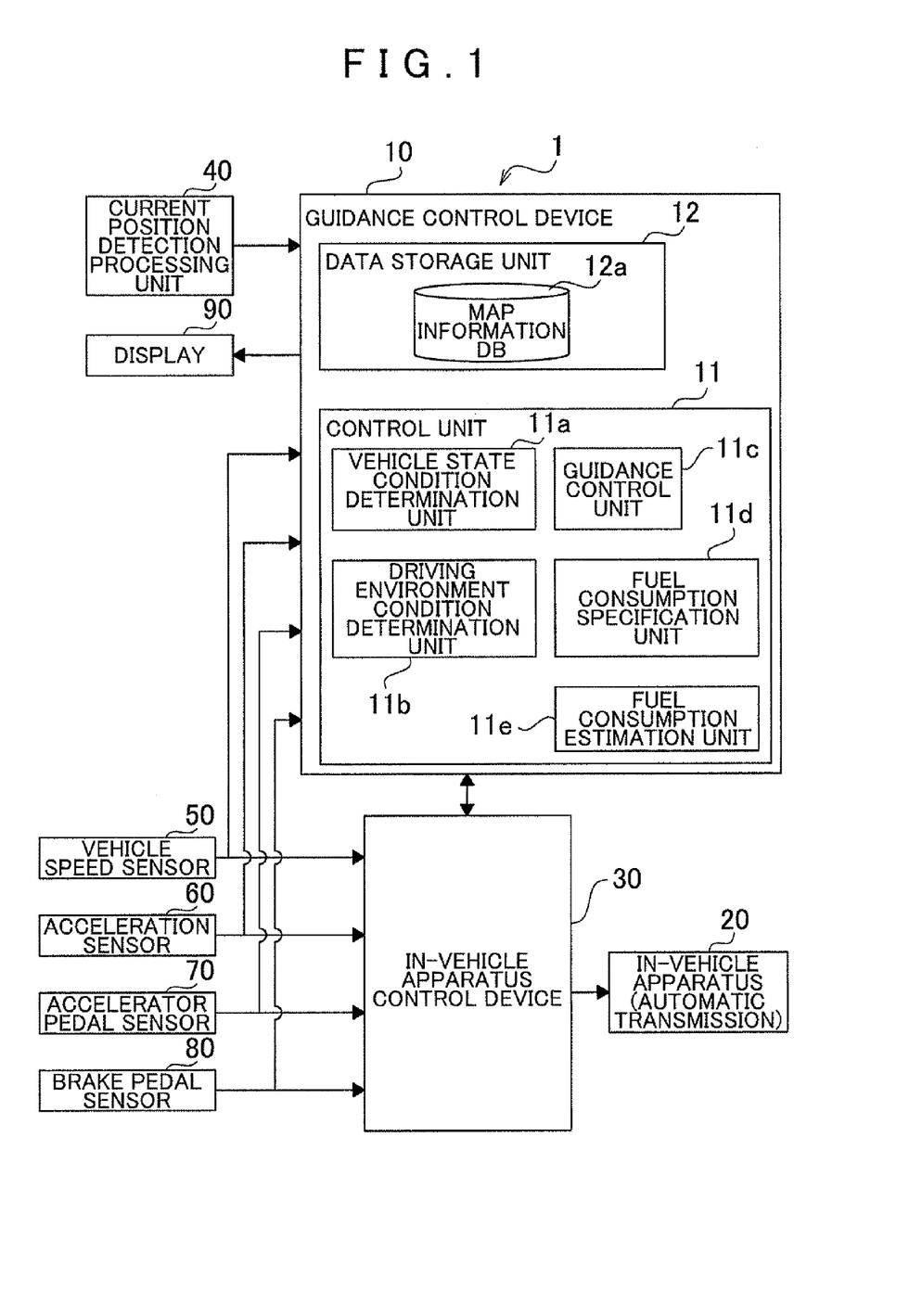
FIG. 1 is a block diagram that illustrates a guidance control device according to an example and other related devices.

The constitution of the guidance control device according to the present example will be described first. FIG. 1 is a block diagram that illustrates the guidance control device according to the present example and other related devices. As shown in FIG. 1, a vehicle 1 installed with the guidance control device 10 includes, in addition to the guidance control device 10, an in-vehicle apparatus 20, an in-vehicle apparatus control device 30, a current position detection processing unit 40, a vehicle speed sensor 50, an acceleration sensor 60, an accelerator pedal sensor 70, a brake pedal sensor 80, and a display 90.

A. In-Vehicle Apparatus

The in-vehicle apparatus 20 is mounted in the vehicle 1 and controlled by the in-vehicle control device 30 based on vehicle state information that specifies a state of the vehicle 1 and driving environment information that specifies a driving environment of the vehicle 1. Here, the "vehicle state information" includes information that specifies a state of the vehicle 1 itself, such as a vehicle speed, an acceleration/deceleration, an accelerator operation amount, and a brake operation amount, for example. The "driving environment information" includes information that specifies various aspects of the environment around a driving position of the vehicle 1, such as position information that specifies the position of the vehicle 1, and road information that specifies a shape and a grade of a road on which the vehicle 1 is traveling, a road friction coefficient, for example. The in-vehicle apparatus 20 mentioned above corresponds to an automatic transmission, a suspension, and a vehicle attitude control system, for example. In the following description, as an example, an automatic transmission 20 is employed as the in-vehicle apparatus 20.

B. In-Vehicle Apparatus Control Device

The in-vehicle apparatus control device 30 performs a control of the in-vehicle apparatus 20 based on the vehicle state information and the driving environment information. For example, in the case of the automatic transmission 20 as the in-vehicle apparatus 20, the in-vehicle apparatus control device 30 selects a suitable shift speed that corresponds to the vehicle speed, the accelerator operation amount, and the like based on a shift map (not shown in the drawing), and performs a shift control of the automatic transmission 20 to achieve the selected shift speed. Further, if a predetermined vehicle state condition is established based on the vehicle state information or if a predetermined driving environment condition is established based on the driving environment information, a shift control that changes the shift map to be referenced or a shift control that executes compulsory shifting regardless of the shift map is performed. Note that the specific content of the vehicle state condition and the driving environment condition will be described in more detail later.

C. Current Position Detection Processing Unit

The current position detection processing unit 40 detects the current position of the vehicle 1 installed with the guidance control device 10. Specifically, the current position detection processing unit 40 has at least one of a GPS, a geomagnetic sensor, a distance sensor, and a gyroscopic sensor (none of which are shown in the drawing), and detects the current position (coordinates), heading, and the like of the vehicle 1 using a commonly known method.

D. Vehicle Speed Sensor

The vehicle speed sensor 50 outputs a vehicle speed pulse signal, which is proportional to a rotational speed of an axle or the like, to the guidance control device 10 and the in-vehicle apparatus control device 30. A commonly known vehicle speed sensor may be used.

E. Acceleration Sensor

The acceleration sensor 60 outputs an output signal, which is proportional to an acceleration of the vehicle 1, to the guidance control device 10 and the in-vehicle apparatus control device 30. Various types of acceleration sensors, such as a piezoresistive or capacitance type, may be used.

F. Accelerator Pedal Sensor

The accelerator pedal sensor 70 outputs an output signal, which is proportional to an operation amount of an accelerator pedal, to the guidance control device 10 and the in-vehicle apparatus control device 30. A commonly known accelerator pedal sensor may be used.

G. Brake Pedal Sensor

The brake pedal sensor 80 outputs an output signal, which is proportional to an operation amount of a brake pedal, to the guidance control device 10 and the in-vehicle apparatus control device 30. A commonly known brake pedal sensor may be used.

H. Display

The display 90 is a display unit that displays various types of images based on a control of the guidance control device 10. Note that the specific constitution of the display 90 may take on any form, and a flat panel display such as a commonly known liquid crystal display or organic EL display may be used.

I. Guidance Control Device

The guidance control device 10 performs an output control of guidance related to the control of the in-vehicle apparatus 20, and includes a control unit 11 and a data storage unit 12.

1. Control Unit

The controller (e.g., control unit 11) controls the guidance control device 10. Specifically, the control unit 11 is a computer with a configuration that includes a CPU, various programs that are interpreted and executed in the CPU (including an OS and other basic control programs, and application programs that are activated in the OS to carry out specific functions), and an internal memory such as a RAM for storing the programs and various data. In particular, the guidance control program according to the present example is installed in the guidance control device 10 through any storage medium or network, and configures various portions of the control unit 11 in substance.

The control unit 11, in terms of functional concepts, includes a vehicle state condition determination unit 11a, a driving environment condition determination unit 11b, a guidance control unit 11c, a fuel consumption specification unit 11d, and a fuel consumption estimation unit 11e.

The vehicle state condition determination unit 11a determines whether a vehicle state condition is established if the control of the in-vehicle apparatus 20 is performed. The driving environment condition determination unit 11b determines whether a driving environment condition is established if the control of the in-vehicle apparatus 20 is performed. The guidance control unit 11e performs an output control of guidance based on whether the vehicle state condition is established and whether the driving environment condition is established.

The fuel consumption specification unit 11d specifies a fuel consumption of the vehicle 1 in a predetermined travel segment. The fuel consumption estimation unit 11e estimates a tentative fuel consumption of the vehicle 1 in the predetermined travel segment. The processes that are executed by these constituent elements of the control unit 11 will be described in detail later.

3. Data Storage Unit

The data storage unit 12 is a storage unit that stores programs and various data required for operation of the guidance control device 10, and has a configuration that uses a hard disk (not shown in the drawing) as an external memory device, for example. However, any other storage mediums, including a magnetic storage medium such as a magnetic disk or an optical storage medium such as a DVD or Blu-ray disc, can be used in place of or in combination with the hard disk.

The data storage unit 12 has a map information database 12a, (Note that database will be abbreviated to "DB" below.) The map information DB 12a is a map information storage unit that stores map information. The "map information" includes, for example, link data (link number, connection node number, road coordinates, road type, number of lanes, travel restrictions, and the like), node data (node number and coordinates), feature data (traffic signals, road signs, guard rails, buildings, and the like), topography data (road shape, road grade, road friction coefficient, and the like), and map display data for displaying a map on the display 90.

II. Processing

Exemplary processing/methods will be described. The exemplary methods may be implemented, for example, by one or more components of the above-described control device 10. For example, the methods may be implemented in the form of one or more programs stored in the RAM and executed by the control unit 11. However, even though the exemplary structure of the above-described control device 10 may be referenced in the description, it should be appreciated that the structure is exemplary and the exemplary method need not be limited by any of the above-described exemplary structure.

The described processing is roughly divided into a shift control guidance process that performs an output control of guidance related to the control of the in-vehicle apparatus 20, and a fuel consumption guidance process that performs an output control of guidance related to the fuel consumption and the tentative fuel consumption. These processes will be explained below with reference to the algorithms shown in FIGS. 2-6.

A. Shift Control Guidance Process

Figure 2:
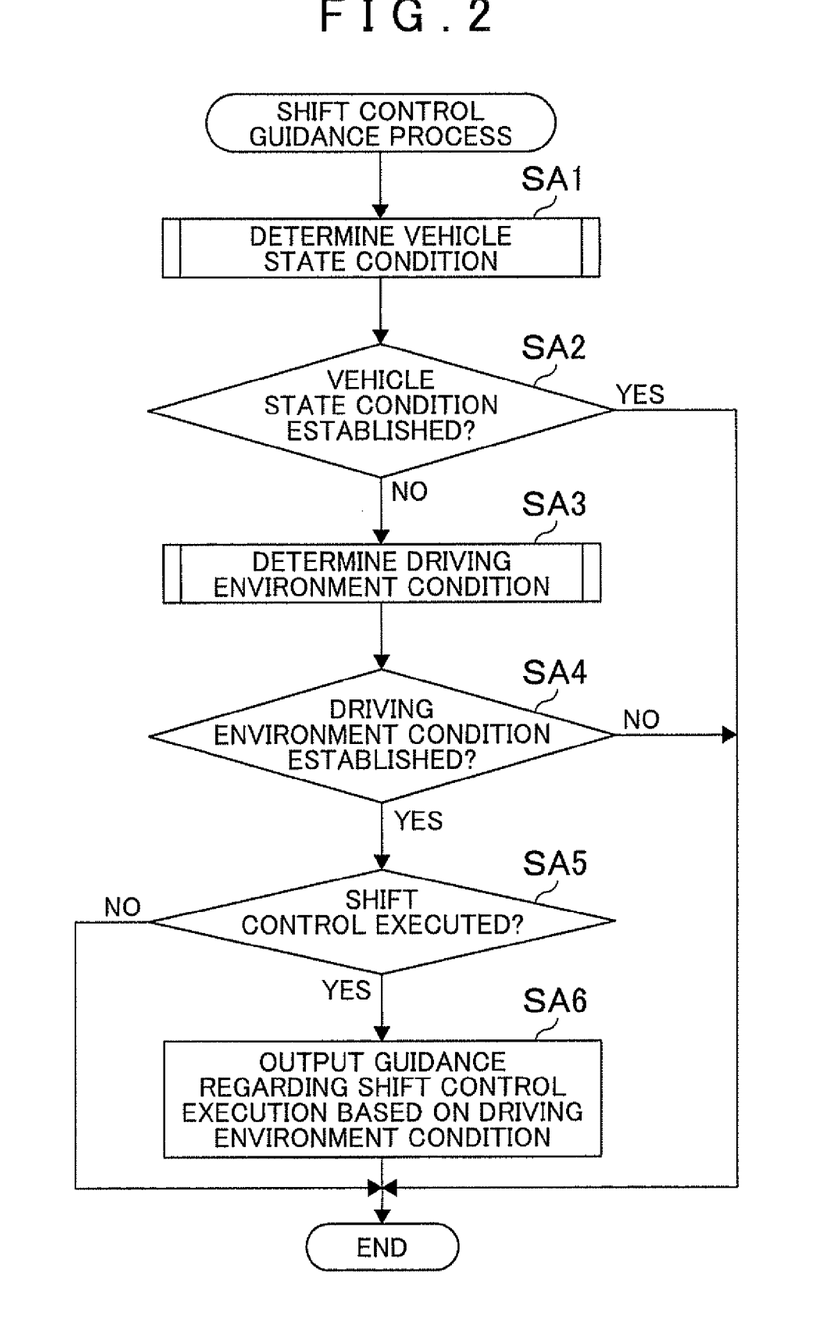
FIG. 2 is a flowchart of a shift control guidance process.

The shift control guidance process will be described first, FIG. 2 is a flowchart of the shift control guidance process (steps in the descriptions of each process below are abbreviated to "S"). The shift control guidance process is repeatedly initiated in predetermined cycles after the vehicle 1 starts traveling, for example.

After initiation of the shift control guidance process, the vehicle state condition determination unit 11a determines whether a vehicle state condition is established (SA1).

1. Vehicle State Condition Determination Process

Figure 3:
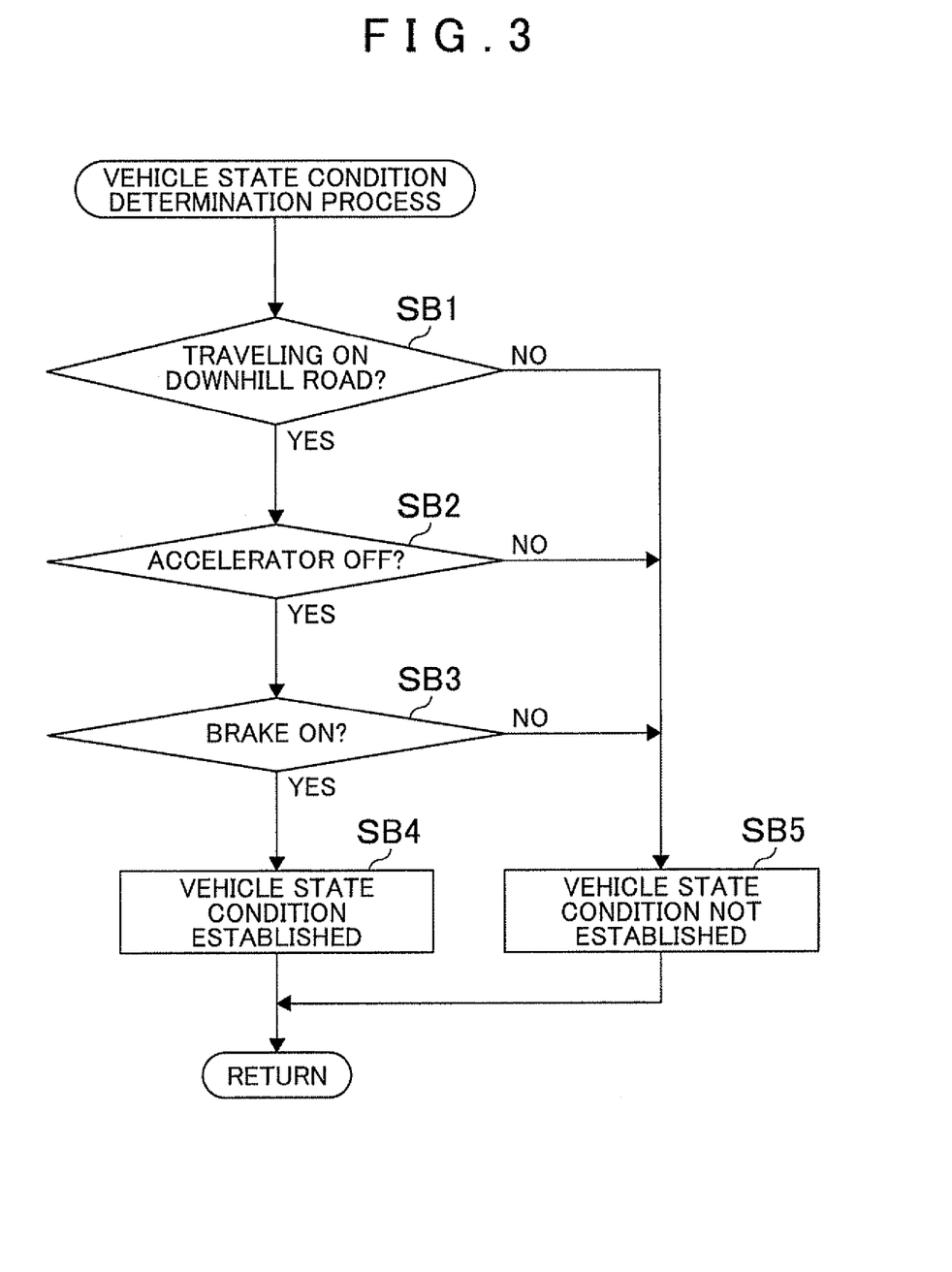
FIG. 3 is a flowchart of a vehicle state condition determination process.

The vehicle state condition determination process performed at SA1 by the vehicle sate condition determination unit 11a will be explained in detail here. FIG. 3 is a flowchart of the vehicle state condition determination process. The vehicle state condition whose establishment is determined in the vehicle state condition determination process is a condition that serves as a standard of whether the in-vehicle apparatus control device 30 performs the control of the in-vehicle apparatus 20. In other words, if it is determined that the vehicle state condition is established, this means that a condition for the in-vehicle apparatus control device 30 to perform the control of the in-vehicle apparatus 20 is established.

As shown in FIG. 3, once the vehicle state condition determination process is initiated, the vehicle state condition determination unit 11a determines whether the vehicle 1 is traveling on a downhill road, based on vehicle state information such as the vehicle speed, the acceleration, and the accelerator operation amount (SB1). Any judgment criteria may be used to determine whether the vehicle 1 is traveling on a downhill road. For example, the vehicle 1 may be determined as traveling on a downhill road based on a comparison of a predicted acceleration of the vehicle 1 and an actual acceleration of the vehicle 1. The predicted acceleration is calculated by using the accelerator operation amount specified through the accelerator pedal sensor 70, the vehicle speed specified through the vehicle speed sensor 50, and the like as parameters, and assuming that the vehicle 1 is traveling on a flat road. The actual acceleration is specified through the acceleration sensor 60. If the actual acceleration is greater than the predicted acceleration, the vehicle 1 is determined to be traveling on a downhill road. Note that the actual acceleration of the vehicle 1 may be specified based on a change in the vehicle speed acquired through the vehicle speed sensor 50.

If it is determined that the vehicle 1 is traveling on a downhill road based on the determination result at SB1 (SB1: Yes), the vehicle state condition determination unit 11a determines whether the accelerator pedal is undepressed (the accelerator is off) based on the accelerator operation amount specified through the accelerator pedal sensor 70 (SB2).

If it is consequently determined that the accelerator is off (SB2: Yes), the vehicle state condition determination unit 11a determines whether the brake pedal is depressed (the brake is on) based on the brake operation amount specified through the brake pedal sensor 80 (SB3).

If it is consequently determined that the brake is on (SB3: Yes), the vehicle state condition determination unit 11a determines that the vehicle 1 is traveling on a downhill road and that the driver intends to decelerate the vehicle 1. Thus, the vehicle state condition determination unit 11a determines that the vehicle state condition for the in-vehicle apparatus control device 30 to perform a shift control of the automatic transmission 20 is established (SB4).

However, if it is determined at SB1 that the vehicle 1 is not traveling on a downhill road (SB1: No), or determined at SB2 that the accelerator is not off (the accelerator pedal is depressed) SB2: No), or determined at SB3 that the brake is not on (the brake pedal is not depressed), the vehicle state condition determination unit 11a determines that either the vehicle 1 is not traveling on a downhill road or the driver does not intend to decelerate the vehicle 1. Thus, the vehicle state condition determination unit 11a determines that the vehicle state condition is not established (SB5). After the processing at SB4 and SB5, the routine returns to the main routine.

Returning to FIG. 2, the determination result of whether the vehicle state condition is established at SA1 is used to determine whether the vehicle state condition is established (SA2). If it is consequently determined that the vehicle state condition is established (SA2: Yes), the guidance control unit 11c determines that there is no need to perform an output control of guidance related to the shift control of the automatic transmission 20, and ends the shift control guidance process.

However, if it is determined that the vehicle state condition is not established (SA2: No), the driving environment condition determination unit 11b determines whether a driving environment condition is established (SA3).

2. Driving Environment Condition Determination Process

Figure 4:
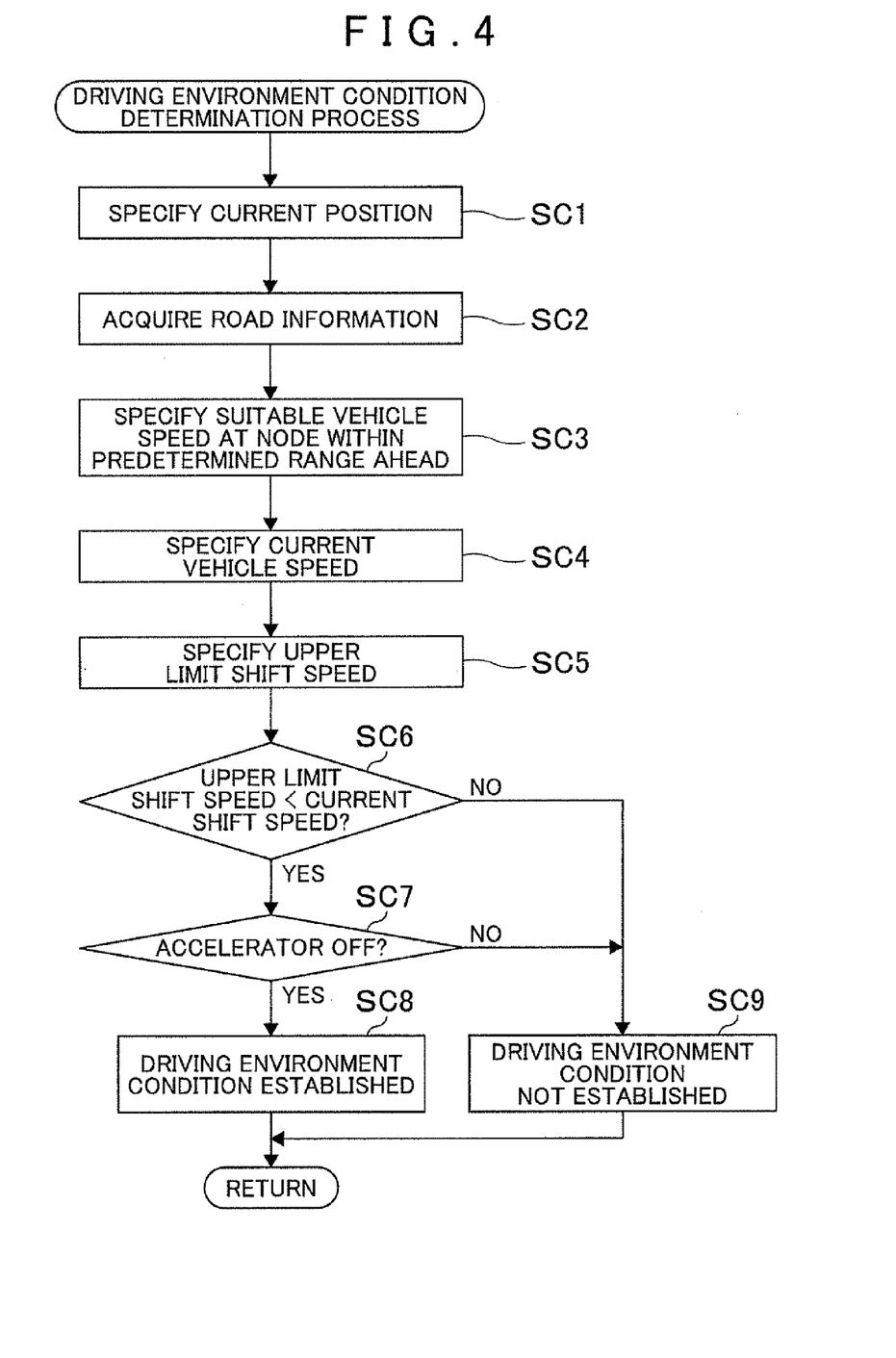
FIG. 4 is a flowchart of a driving environment condition determination process.

The driving environment condition determination process performed at SA3 by the driving environment condition determination unit 11b will be explained in detail here. FIG. 4 is a flowchart of the driving environment condition determination process. The driving environment condition whose establishment is determined in the driving environment condition determination process is a condition that serves as a standard of whether the in-vehicle apparatus control device 30 performs the control of the in-vehicle apparatus 20. In other words, if it is determined that the driving environment condition is established, this means that a condition for the in-vehicle apparatus control device 30 to perform the control of the in-vehicle apparatus 20 is established.

As shown in FIG. 4, once the driving environment condition determination process is initiated, the current position of the vehicle 1 is specified through the current position detection processing unit 40 (SC1). Next, based on the current position specified at SC1, the driving environment condition determination unit 11b acquires road information related to the road on which the vehicle 1 is traveling from the map information DB 12a (SC2). This road information includes, for example, the type of road on which the vehicle 1 is traveling, the shape of the road ahead of the vehicle 1, the coordinates of nodes ahead of the current position of the vehicle 1, and the like.

The driving environment condition determination unit 11b then specifies a suitable vehicle speed at a node within a predetermined range ahead of the vehicle 1. Any method may be used for specifying the suitable vehicle speed. For example, a curvature radius of the road at each node may be calculated based on an intersection angle of links that intersect at the node. Based on the calculated curvature radius, the suitable vehicle speed when passing through the position of each node (e.g. a vehicle speed at which the vehicle 1 can safely travel through each node) is calculated.

Next, the driving environment condition determination unit 11b specifies the current vehicle speed of the vehicle 1 based on input from the vehicle speed sensor 50 (SC4). The driving environment condition determination unit 11b subsequently specifies an appropriate upper limit shift speed for decelerating the vehicle 1 from the specified current vehicle speed to the suitable vehicle speed at each node specified at SC3 (SC5). Any method may be used for specifying the upper limit shift speed. For example, a deceleration necessary for decelerating the vehicle 1 from the current vehicle speed to the suitable vehicle speed at each node may be calculated, and the appropriate upper limit shift speed is specified based on the calculated deceleration and the current vehicle speed.

The driving environment condition determination unit 11b then specifies the current shift speed of the automatic transmission 20 through the in-vehicle apparatus control device 30, and determines whether the specified current shift speed is greater than the upper limit shift speed specified at SC5 (SC6).

If it is consequently determined that the current shift speed is greater than the upper limit shift speed (SC6: Yes), the driving environment condition determination unit 11b determines whether the accelerator is off based on the accelerator operation amount specified through the accelerator pedal sensor 70 (SC7). If it is consequently determined that the accelerator is off (SC7: Yes), the driving environment condition determination unit 11b determines that the vehicle 1 needs to decelerate in accordance with the road shape and the like ahead and that the driver intends to decelerate the vehicle 1. Thus, the driving environment condition determination unit 11b determines that the driving environment condition for the in-vehicle apparatus control device 30 to perform a shift control of the automatic transmission 20 is established (SC8).

However, if it is determined at SC6 that the current shift speed is not greater than the upper limit shift speed (the current shift speed is equal to or less than the upper limit shift speed) (SC6: No), or determined at SC7 that the accelerator is not off (the accelerator pedal is depressed) (SC7: No), the driving environment condition determination unit 11b determines that either the current shift speed is already the appropriate shift speed or the driver does not intend to decelerate the vehicle 1. Thus, the driving environment condition determination unit 11b determines that the driving environment condition is not established (SC9). After the processing at SC8 and SC9, the routine returns to the main routine.

Returning to FIG. 2, the determination result of whether the driving environment condition is established at SA3 is used to determine whether the driving environment condition is established (SA4). If it is consequently determined that the driving environment condition is not established (SA4: No), the guidance control unit 11c determines based on whether the vehicle state condition and the driving environment condition are established that the shift control of the automatic transmission 20 will not be performed and there is no need to perform an output control of guidance related to the shift control. The guidance control unit 11c thus ends the shift control guidance process.

However, if it is determined that the driving environment condition is established (SA4: Yes), the guidance control unit 11c determines whether the shift control of the automatic transmission 20 is performed by the in-vehicle apparatus control device 30 (SA5).

If it is consequently determined that the shift control of the automatic transmission 20 is performed by the in-vehicle apparatus control device 30 (SA5: Yes), the guidance control unit 11c performs an output control of guidance to the effect that the shift control of the automatic transmission 20 is performed based on establishment of the driving environment condition (SA6), and ends the shift control guidance process. Note that the output of guidance regarding the execution of the shift control of the automatic transmission 20 may take on any form. For example, the execution of the shift control of the automatic transmission 20 based on establishment of the driving environment condition may be displayed on the display 90, or output and displayed by a display device such as an LED (not shown in the drawing).

However, if the shift control of the automatic transmission 20 by the in-vehicle apparatus control device 30 is not performed (SA5: No), the guidance control unit 11c determines that there is no need to perform an output control of guidance related to the shift control because the shift control of the automatic transmission 20 is not performed. The guidance control unit 11e thus ends the shift control guidance process. Note that instances where the shift control of the automatic transmission 20 is not performed regardless of the establishment of the driving environment condition include a case in which a setting is made so that the shift control is not performed based on the driving environment condition, and a case in which the driver's operation input for the automatic transmission 20 is prioritized (a manual mode), for example.

B. Fuel Consumption Guidance Process

The fuel consumption guidance process will be described next. The fuel consumption guidance process is roughly divided into a first fuel consumption guidance process that is executed when a setting is made to not perform the shift control based on the driving environment condition, and a second fuel consumption guidance process that is executed when a setting is made to perform the shift control based on the driving environment condition.

1. First Fuel Consumption Guidance Process

Figure 5:
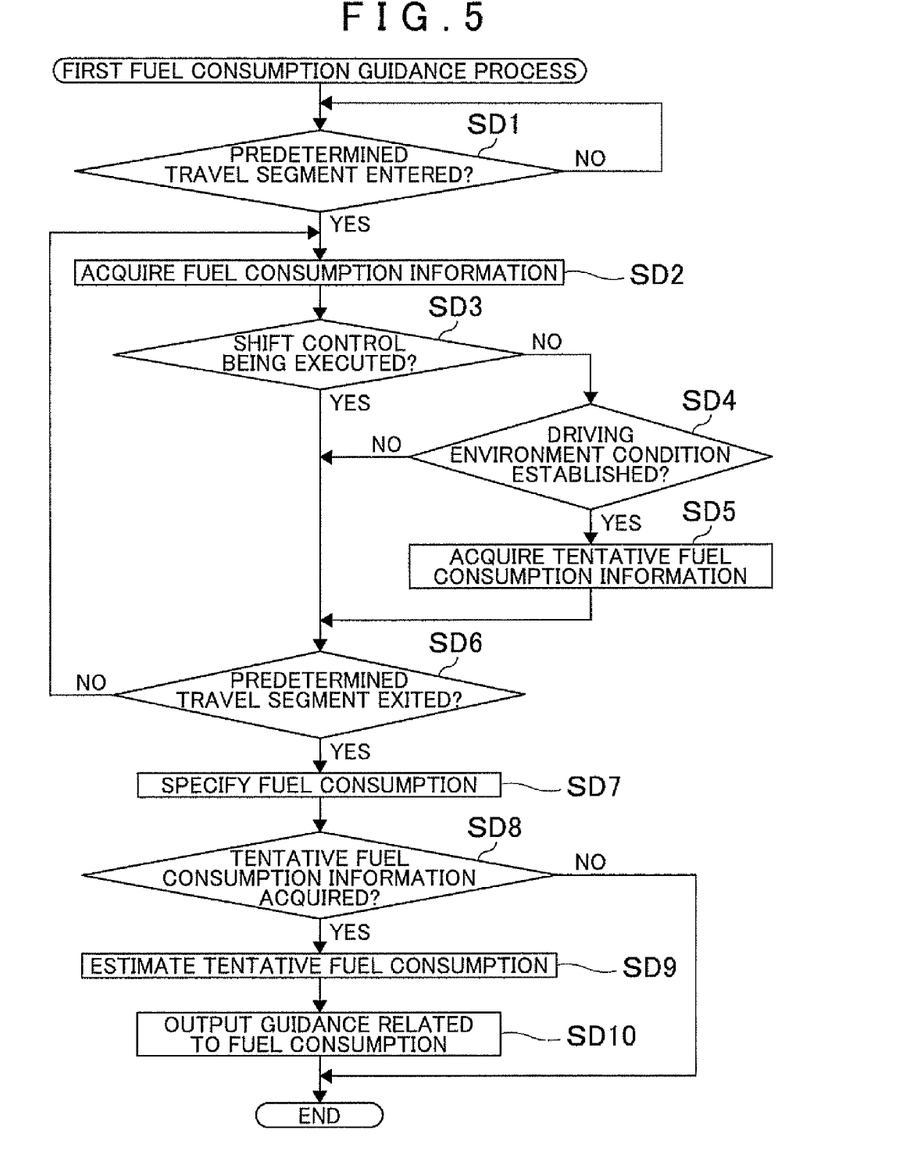
FIG. 5 is a flowchart of a first fuel consumption guidance process.

The first fuel consumption guidance process will be described first. FIG. 5 is a flowchart of the first fuel consumption guidance process. When a setting is made to not perform the shift control based on the driving environment condition, the first fuel consumption guidance process is repeatedly initiated in predetermined cycles concurrently with the shift control guidance process of FIG. 2 after the vehicle 1 starts traveling, for example.

After initiation of the first fuel consumption guidance process, the fuel consumption specification unit 11d stands by until the vehicle 1 enters a predetermined travel segment (SD1: No). Here, the predetermined travel segment is a travel segment of the vehicle 1 for which a fuel consumption is specified and a tentative fuel consumption is estimated in the first fuel consumption guidance process. For example, the predetermined travel segment spans from a start point of a downhill road to its end point.

If the vehicle 1 has entered the predetermined travel segment (SD 1: Yes), the fuel consumption specification unit 11d acquires fuel consumption information for specifying the fuel consumption (SD2). As the fuel consumption information, a fuel injection amount, an accelerator operation amount, an air inflow, an engine load, or a remaining amount of fuel in a fuel tank may be used, for example.

Next, the fuel consumption estimation unit 11e determines whether the shift control of the automatic transmission 20 is being performed by the in-vehicle apparatus control device 30 (SD3). If it is consequently determined that the shift control of the automatic transmission 20 is not being performed (SD3: No), the fuel consumption estimation unit 11e determines whether the driving environment condition is established (SD4).

If it is consequently determined that the driving environment condition is established (SD4: Yes), the fuel consumption estimation unit 11e acquires tentative fuel consumption information for estimating the tentative fuel consumption (SD5). Here, the tentative fuel consumption refers to an estimated fuel consumption of the vehicle 1 that, when the shift control is not performed and the driving environment condition is established in the predetermined travel segment, assumes the shift control is performed based on whether the driving environment condition is established in the travel segment. In such case, as the tentative fuel consumption information for estimating the tentative fuel consumption of the vehicle 1, the actual fuel injection amount, the accelerator operation amount, or the remaining amount of fuel in the fuel tank, for example, is acquired for a segment traveled by the vehicle 1 while the driving environment condition is established but the shift control of the automatic transmission 20 is not executed. Note that instances where the shift control of the automatic transmission 20 is not performed regardless of the establishment of the driving environment condition include a case in which a setting is made so that the shift control is not performed based on the driving environment condition, and a case in which the driver's operation input for the automatic transmission 20 is prioritized (a manual mode), for example. For example, a determination of No at SA5 in FIG. 2 corresponds to such a case.

If it is determined at SD3 that the shift control of the automatic transmission 20 is being performed (SD3: Yes), or determined at SD4 that the driving environment condition is not established (SD4: No), or after the processing at SD5, the fuel consumption specification unit 11d determines whether the vehicle 1 has exited the predetermined travel segment (SD6). If it is determined that the vehicle 1 has not exited the travel segment (SD6: No), the routine returns to SD2 and the fuel consumption specification unit 11d acquires the fuel consumption information.

However, if it is determined that the vehicle 1 has exited the predetermined travel segment (SD6: Yes), the fuel consumption specification unit 11d specifies the fuel consumption of the vehicle 1 in the predetermined travel segment based on the fuel consumption information acquired at SD2 (SD7). The specific method used for specifying the fuel consumption may take on any form. For example, the fuel consumption may be specified by integrating the fuel injection amount in the predetermined travel segment. Alternatively, the fuel injection amount may be calculated based on the accelerator operation amount, the air inflow, the engine load, and the like, and the fuel consumption specified by integrating the calculated fuel injection amount. The fuel consumption may also be specified based on a difference in the remaining amount of fuel before and after traveling the predetermined travel segment.

Next, the fuel consumption estimation unit 11e determines whether the tentative fuel consumption information was acquired while the vehicle 1 traveled through the predetermined travel segment (SD8). Acquisition of the tentative fuel consumption information at SD5 means that, in the travel segment, the shift control is not performed (SD3: No) and the driving environment condition is established (SD4: Yes). Therefore, the determination at SD8 refers to determining whether the shift control is not performed and the driving environment condition is established in the travel segment.

If it is consequently determined that the tentative fuel consumption information is acquired (if the shift control is not performed and the driving environment condition is established in the travel segment) (SD8: Yes), the fuel consumption estimation unit 11e estimates the tentative fuel consumption of the vehicle 1 that, based on the tentative fuel consumption information acquired at SD5, assumes the shift control is performed based on whether the driving environment condition is established in the travel segment (SD9). The specific method used for estimating the tentative fuel consumption may take on any form. For example, the shift speed may be maintained at a high shift speed and the engine speed maintained at a high speed if the shift control is performed based on whether the driving environment condition is established. Therefore, if the shift control is assumed to have been performed, the fuel consumption is assumed to decrease to zero due to a fuel cut. In other words, the actual fuel consumption in the segment traveled by the vehicle 1, with the driving environment condition established but without the shift control of the automatic transmission 20 executed, is specified based on the fuel injection amount, the accelerator operation amount, the remaining amount of fuel in the fuel tank, or the like. A value found by subtracting the specified fuel consumption from the fuel consumption specified at SD7 is estimated to be the tentative fuel consumption.

After the processing at SD9, the guidance control unit 11c performs an output control of guidance related to the fuel consumption specified at SD7 and the tentative fuel consumption estimated at SD9 (SD10), and ends the first fuel consumption guidance process.

Figure 7A:
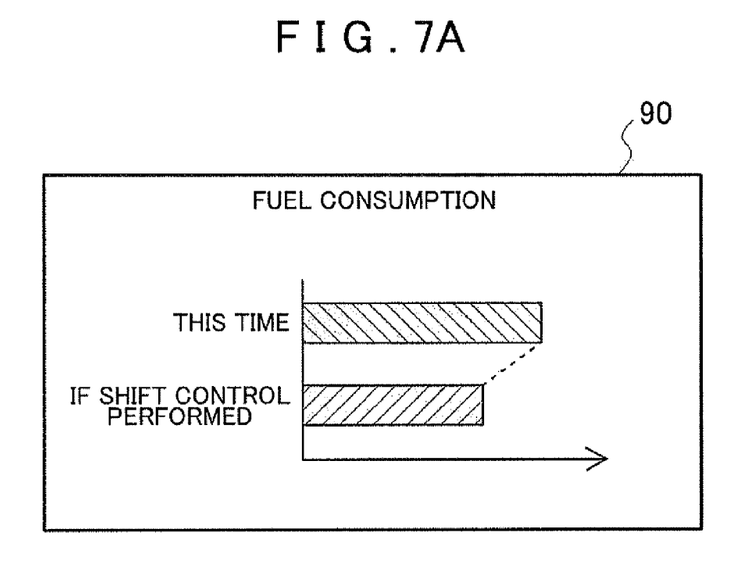
FIG. 7A is a drawing that displays a fuel consumption specified at SD7 and a tentative fuel consumption estimated at SD9 in FIG. 5.
Figure 7B:
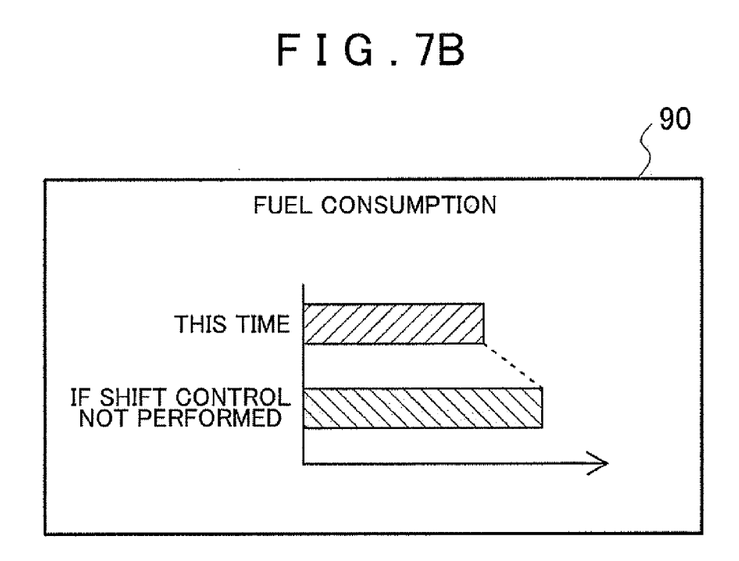
FIG. 7B is a drawing that displays a fuel consumption specified at SE7 and a tentative fuel consumption estimated at SE9 in FIG. 6.

FIGS. 7A and 7B are drawings that illustrate the display 90, which outputs guidance based on the output control of the guidance control unit 11c. FIG. 7A is a drawing that displays the fuel consumption specified at SD7 and the tentative fuel consumption estimated at SD9 in FIG. 5.

As shown in FIG. 7A, if it is determined at SD8 in FIG. 5 that the tentative fuel consumption information is acquired (if the shift control is not performed and the driving environment condition is established in the travel segment) (SD8: Yes), guidance is provided to the effect that the tentative fuel consumption of the vehicle 1 assuming the shift control is performed in the predetermined travel segment is a smaller value than the actual fuel consumption specified at SD7.

Returning to FIG. 5, if it is determined at SD8 that the tentative fuel consumption information is not acquired (SD8: No), the guidance control unit 11e determines that an output control of guidance related to the fuel consumption and the tentative fuel consumption cannot be performed, and ends the first fuel consumption guidance process.

2. Second Fuel Consumption Guidance Process

Figure 6:
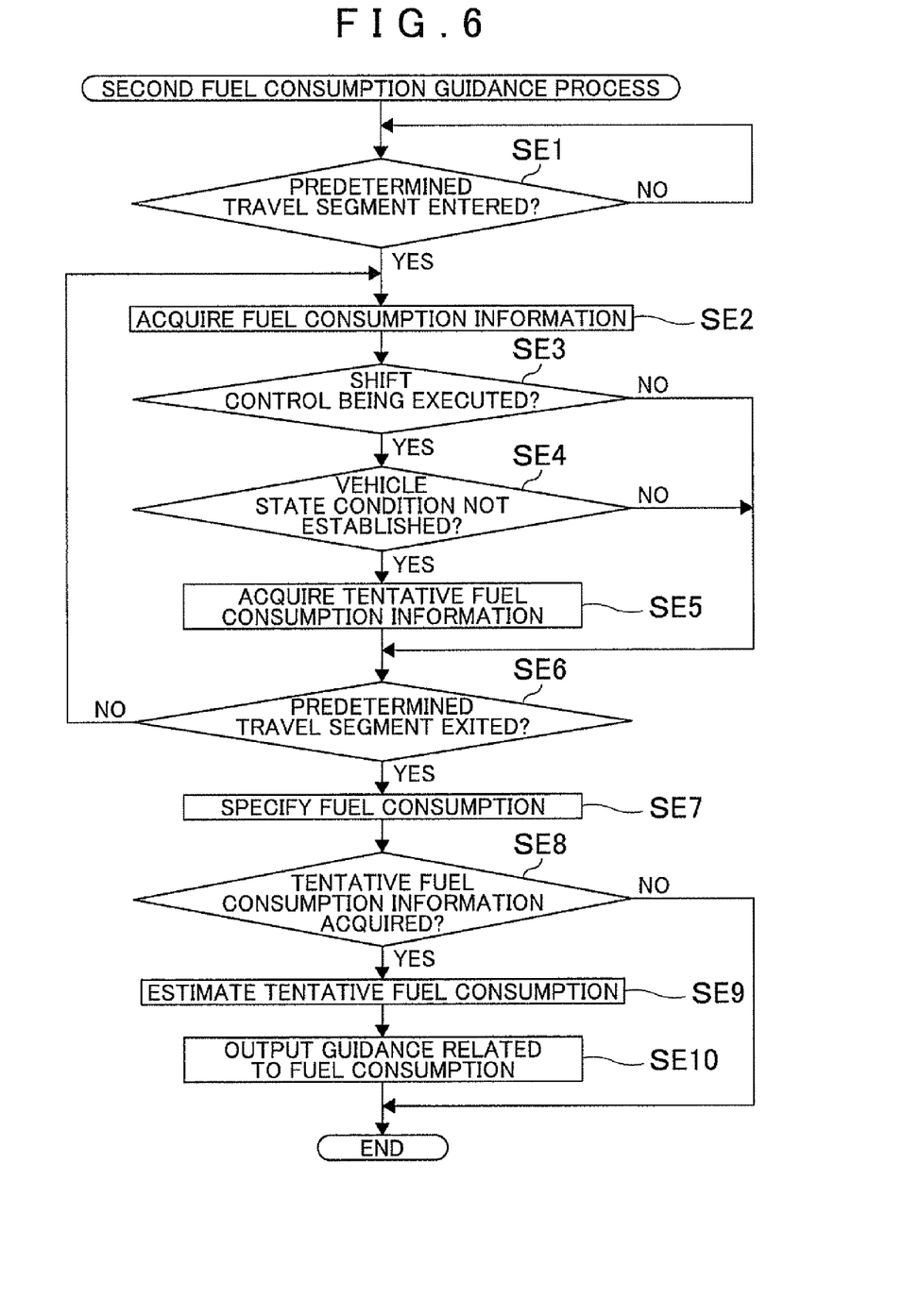
FIG. 6 is a flowchart of a second fuel consumption guidance process.

The second fuel consumption guidance process will be described next. FIG. 6 is a flowchart of the second fuel consumption guidance process. Note that SE1 to SE3, SE7, and SE10 of the second fuel consumption guidance process are respectively identical to SD1 to SD3, SD7, and SD10 of the first fuel consumption guidance process in FIG. 5, and will not be further explained here. The second fuel consumption guidance process is repeatedly initiated in predetermined cycles concurrently with the shift control guidance process of FIG. 2 after the vehicle 1 starts traveling, for example, when a setting is made to perform the shift control based on the driving environment condition.

If it is determined that the shift control of the automatic transmission 20 is performed as a result of the determination at SE3 (SE3: Yes), the fuel consumption estimation unit 11e determines whether the vehicle state condition is not established (SE4).

If it is consequently determined that the vehicle state condition is not established (SE4: Yes), the fuel consumption estimation unit 11e acquires tentative fuel consumption information for estimating the tentative fuel consumption (SE5). Here, the tentative fuel consumption refers to an estimated fuel consumption of the vehicle 1 that, when the shift control is performed based on whether only the driving environment condition is established in the predetermined travel segment, assumes the shift control is not performed based on whether only the driving environment condition is established in the travel segment. In such case, as the tentative fuel consumption information for estimating the tentative fuel consumption of the vehicle 1, the length of the segment traveled by the vehicle 1 and the vehicle speed in the segment, for example, are acquired under circumstances where the shift control is performed due to establishment of only the driving environment condition (if the determination at SA5 in FIG. 2 is Yes).

If it is determined at SE3 that the shift control of the automatic transmission 20 is not performed (SE3: No), or determined at SE4 that the vehicle condition is not not established (the vehicle state condition is established) (SE4: No), or after the processing at SE5, the fuel consumption specification unit 11d determines whether the vehicle 1 has exited the predetermined travel segment (SE6).

After the fuel consumption is specified at SE7, the fuel consumption estimation unit 11e determines whether the tentative fuel consumption information was acquired while the vehicle 1 traveled through the predetermined travel segment (SE8). Acquisition of the tentative fuel consumption information at SE5 means that, in the travel segment, the shift control is performed (SE3: Yes) and the vehicle state condition is not established (SE4: Yes). Therefore, the determination at SE8 refers to determining whether the shift control is performed due to establishment of only the driving environment condition in the travel segment.

If it is consequently determined that the tentative fuel consumption information is acquired (if the shift control is performed due to establishment of only the driving environment condition in the travel segment) (SE8: Yes), the fuel consumption estimation unit 11e estimates the tentative fuel consumption of the vehicle 1 that, based on the tentative fuel consumption information acquired at SE5, assumes the shift control is not performed in the travel segment (SE9). The specific method used for estimating the tentative fuel consumption may take on any form. For example, the segment driving time may be calculated from the length of the segment traveled by the vehicle 1 and the vehicle speed, under circumstances where the shift control is performed based on whether only the driving environment condition is established. The fuel consumption is then integrated, assuming that fuel is consumed at the fuel injection amount during idling over the calculated driving time. A value found by adding the integrated fuel consumption to the fuel consumption specified at SE5 is estimated to be the tentative fuel consumption.

FIG. 7B is a drawing that displays the fuel consumption specified at SE7 and the tentative fuel consumption estimated at SE9 in FIG. 6. As shown in FIG. 7B, if it is determined at SE8 in FIG. 6 that the tentative fuel consumption information is acquired (if the shift control is performed due to establishment of only the driving environment condition in the travel segment) (SE8: Yes), guidance is provided to the effect that the tentative fuel consumption of the vehicle 1 assuming the shift control is not performed in the predetermined travel segment is a larger value than the actual fuel consumption specified at SE7.

III. Effects

According to the example described above, when the control of the in-vehicle apparatus 20 is performed, an output control of guidance is performed based on whether the vehicle state condition determination unit 11a determines establishment of the vehicle state condition and whether the driving environment condition determination unit 11b determines establishment of the driving environment condition. Therefore, it is possible to perform an output control of guidance related to the control of the in-vehicle apparatus 20 such that the driver can know what information the control of the in-vehicle apparatus 20 is executed based on.

In particular, in a case where the vehicle state condition determination unit 11a determines that the vehicle state condition is not established and the driving environment condition determination unit 11b determines that the driving environment condition is established, if the control of the in-vehicle apparatus 20 is performed following establishment of the driving environment condition, an output control is performed of guidance to the effect that the control of the in-vehicle apparatus 20 is performed based on establishment of the driving environment condition. Therefore, it is possible to perform an output control of guidance related to the control of the in-vehicle apparatus 20 such that the driver can easily know that the control of the in-vehicle apparatus 20 is performed based on establishment of the driving environment condition.

An output control is performed of guidance related to the fuel consumption of the vehicle 1 in the predetermined travel segment; and the tentative fuel consumption of the vehicle 1 that, when the shift control is not performed and the driving environment condition is established in the travel segment, assumes the shift control is performed based on whether the driving environment condition is established in the travel segment. Therefore, it is possible to perform an output control of guidance such that a fuel conservation effect assuming the shift control is performed based on whether the driving environment condition is established can be more clearly recognizable.

An output control is performed of guidance related to the fuel consumption of the vehicle 1 in the predetermined travel segment; and the tentative fuel consumption of the vehicle 1 that, when the shift control is performed due to establishment of only the driving environment condition in the travel segment, assumes the shift control is not performed in the travel segment. Therefore, it is possible to perform an output control of guidance such that a fuel conservation effect due to actually performing the shift control based on whether the driving environment condition is established can be more clearly recognizable.

The driving environment information includes position information that specifies the current position of the vehicle 1, and road information that specifies the shape of the road. Therefore, it is possible to perform an output control of guidance related to the control of the in-vehicle apparatus 20 such that the driver can know that the control of the in-vehicle apparatus 20 is executed based on the position information and the road information.

The problems to be solved by the inventive principles described herein are not limited to the content described above and may vary depending on the environment in which they are practiced and the detailed configuration thereof. The above problems may be only partially solved, and the above effects only partially achieved.

IV. Exemplary Variations

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles. Some examples follow.

1. Division and Integration

The electronic constituent elements described above are merely functional concepts, and need not be physically configured as illustrated in the drawings. That is, the specific form of division or integration of each portion is not limited to that shown in the drawings. The constituent elements, as a whole or in part, can be divided or integrated in any manner either functionally or physically based on various types of loads or use conditions. For example, the function of the guidance control device 10 may be carried out by the in-vehicle apparatus control device 30.

2. In-Vehicle Apparatus

In the above example, as an example, the in-vehicle apparatus 20 was described as the automatic transmission 20. However, the guidance control device 10 can be used for an output control of guidance related to a control of another in-vehicle apparatus 20. For example, the in-vehicle apparatus 20 may be a suspension, wherein the suspension is controlled based on whether the vehicle state condition and/or the driving environment condition is established. In such case, if a control of a damping force of a shock absorber of the suspension is performed, the vehicle state condition determination unit 11*a* may determine whether the vehicle state condition is established based on vehicle state information such as a lateral acceleration acting on the vehicle 1, the driving environment condition determination unit 11*b* may determine whether the driving environment condition is established based on driving environment information such as a curvature radius of a curve ahead of the vehicle 1, and the guidance control unit 11*c* may perform an output control of guidance based on whether the vehicle state condition is established and whether the driving environment condition is established. Thus, it is possible to perform an output control of guidance related to a control of the suspension such that the driver can know what information the control of the suspension is executed based on.

Alternatively, the in-vehicle apparatus 20 may be a vehicle attitude control system that integrates and controls a plurality of in-vehicle apparatuses, wherein the vehicle attitude control system is controlled based on whether the vehicle state condition and/or the driving environment condition is established. In such case, if controls of an engine output and a braking force of each wheel of the vehicle 1 are performed through the vehicle attitude control system, the vehicle state condition determination unit 11*a* may determine whether the vehicle state condition is established based on vehicle state information such as an accelerator operation amount, a brake operation amount, or a steering angle of a steering wheel, the driving environment condition determination unit 11*b* may determine whether the driving environment condition is established based on driving environment information such as a curvature radius of a curve ahead of the vehicle 1 and a road grade, and the guidance control unit 11*c* may perform an output control of guidance based on whether the vehicle state condition is established and whether the driving environment condition is established. Thus, it is possible to perform an output control of guidance related to a control of the vehicle attitude control system such that the driver can know what information the control of the vehicle attitude control system is executed based on.

3. Driving Environment Condition Determination Process

In the above example, an appropriate upper limit shift speed is specified for decelerating the vehicle 1 from the current vehicle speed to a suitable vehicle speed at each node. However, if grade information for specifying a road grade is included in the map information, whether the driving environment condition is established may be determined based on the grade information, the accelerator operation amount, the brake operation amount, and the like.

4. Guidance Output Control

In the above example, at SA6 in FIG. 2, an output control of guidance to the effect that the shift control of the automatic transmission 20 is performed based on establishment of the driving environment condition. However, guidance may also be provided at such time on an effect achieved by the control performed based on the driving environment condition. For example, an output control may be performed of guidance to the effect that environmentally-friendly driving could be realized by a fuel cut that is carried out as a consequence of performing the shift control based on whether the driving environment condition is established. Alternatively, an output control may be performed of guidance to the effect that smooth deceleration and acceleration in accordance with the road shape and the like could be practiced and comfortable driving realized, as a consequence of performing the shift control based on whether the driving environment condition is established.

In addition, an output control may be performed of guidance to the effect that the shift control of the automatic transmission 20 is performed based on non-establishment of the driving environment condition and establishment of the vehicle state condition.

What is claimed is:

1. A guidance control device installed in a vehicle capable of automatic shift control of an automatic transmission, the guidance control device comprising:

a controller configured to:
- access vehicle state information that specifies a state of the vehicle, the vehicle state information being usable to determine whether the vehicle is being decelerated while traveling downhill;
- determine whether the vehicle is being decelerated while traveling downhill based on the accessed vehicle state information;
- access driving environment information that specifies a driving environment of the vehicle, the driving environment information being usable to determine whether the vehicle should be decelerated by executing the automatic shift control;
- determine whether the vehicle should be decelerated based on the accessed driving environment information;
- specify an actual fuel consumption of the vehicle for a particular travel segment;
- when it is determined that the vehicle (1) is not being decelerated while traveling downhill and (2) should be decelerated by executing the automatic shift control:
  - perform automatic shift control; and
  - generate guidance indicating that the automatic shift control is being performed because it has been determined that the vehicle should be decelerated; and
- when (1) the shift control is not being performed, and (2) it is determined that the vehicle should be decelerated by executing the automatic shift control for the particular road segment:
  - estimate a first tentative fuel consumption of the vehicle under the assumption that the shift control was performed in the particular travel segment; and
  - generate guidance indicating the specified actual fuel consumption and the estimated first tentative fuel consumption; and
- cause the generated guidance to be output on a display.

2. The guidance control device according to claim 1, wherein:
the controller is configured to, when the shift control is being performed, estimate a second tentative fuel consumption of the vehicle under the assumption that the shift control was not performed for the particular travel segment; and
the generated guidance indicates the specified actual fuel consumption and the estimated second tentative fuel consumption.

3. The guidance control device according to claim 1, wherein the driving environment information includes:
position information that specifies a current position of the vehicle; and
road information that specifies a shape of a road.

4. The guidance control device according to claim 1, wherein the controller is configured to:
determine whether the vehicle is traveling on a downhill road based on the accessed vehicle state information;
determine whether an accelerator of the vehicle is off based on the accessed vehicle state information;
determine whether a brake of the vehicle is on based on the accessed vehicle state information; and
conclude that the vehicle is being decelerated while traveling downhill when the vehicle is traveling on a downhill road, the accelerator is off, and the brake is on.

5. The guidance control device according to claim 1, wherein the controller is configured to:
determine an upper limit shift speed for the vehicle based on the accessed driving environment information;
specify a current shift speed for the vehicle based on the accessed driving environment information;
determine whether the specified upper limit shift speed is less than the specified current shift speed;
determine whether an accelerator of the vehicle is off based on the accessed driving environment information; and
conclude that the vehicle should be decelerated by executing the automatic shift control if the specified upper limit shift speed is less than the specified current shift speed, and the accelerator is off.

6. The guidance control device according to claim 5, wherein the controller is configured to:
specify a suitable vehicle speed for the particular travel segment; and
determine the upper limit shift speed based on the specified suitable vehicle speed.

7. A controller-implemented guidance control method for controlling an in-vehicle apparatus of a vehicle, the method comprising:
the controller accessing vehicle state information that specifies a state of the vehicle, the vehicle state information being usable to determine whether the vehicle is being decelerated while traveling downhill;
the controller determining whether the vehicle is being decelerated while traveling downhill based on the accessed vehicle state information;
the controller accessing driving environment information that specifies a driving environment of the vehicle, the driving environment information being usable to determine whether the vehicle should be decelerated by executing the automatic shift control;
the controller determining whether the vehicle should be decelerated based on the accessed driving environment information;
the controller specifying an actual fuel consumption of the vehicle for a particular travel segment;
when it is determined that the vehicle (1) is not being decelerated while traveling downhill and (2) should be decelerated by executing the automatic shift control:
the controller performing automatic shift control; and;
the controller generating guidance indicating that the automatic shift control is being performed because it has been determined that the vehicle should be decelerated; and
when (1) the shift control is not being performed, and (2) it is determined that the vehicle should be decelerated by executing the automatic shift control for the particular road segment:
the controller estimating a first tentative fuel consumption of the vehicle under the assumption that the shift control was performed in the particular travel segment; and
the controller generating guidance indicating the specified actual fuel consumption and the estimated first tentative fuel consumption; and
the controller causing the generated guidance to be output on a display.

8. The guidance control method according to claim 7, wherein:
the method further comprises:
when the shift control is being performed, the controller estimating a second tentative fuel consumption of the vehicle under the assumption that the shift control was not performed for the particular travel segment; and the generated guidance indicates the specified actual fuel consumption and the estimated second tentative fuel consumption.

9. The guidance control method according to claim 7, wherein the driving environment information includes:
   position information that specifies a current position of the vehicle; and
   road information that specifies a shape of a road.

10. The guidance control method according to claim 7, further comprising:
    the controller determining whether the vehicle is traveling on a downhill road based on the accessed vehicle state information;
    the controller determining whether an accelerator of the vehicle is off based on the accessed vehicle state information;
    the controller determining whether a brake of the vehicle is on based on the accessed vehicle state information; and
    the controller concluding that the vehicle is being decelerated while traveling downhill when the vehicle is traveling on a downhill road, the accelerator is off, and the brake is on.

11. The guidance control method according to claim 7, further comprising:
    the controller determining an upper limit shift speed for the vehicle based on the accessed driving environment information;
    the controller specifying a current shift speed for the vehicle based on the accessed driving environment information;
    the controller determining whether the specified upper limit shift speed is less than the specified current shift speed;
    the controller determining whether an accelerator of the vehicle is off based on the accessed driving environment information; and
    the controller concluding that the vehicle should be decelerated by executing the automatic shift control if the specified upper limit shift speed is less than the specified current shift speed, and the accelerator is off.

12. The guidance control method according to claim 11, further comprising:
    the controller specifying a suitable vehicle speed for the particular travel segment; and
    the controller determining the upper limit shift speed based on the specified suitable vehicle speed.

13. A non-transitory computer-readable medium storing a computer-executable guidance control program for controlling an in-vehicle apparatus of a vehicle, the program comprising:
    instructions for accessing vehicle state information that specifies a state of the vehicle, the vehicle state information being usable to determine whether the vehicle is being decelerated while traveling downhill;
    instructions for determining whether the vehicle is being decelerated while traveling downhill based on the accessed vehicle state information;
    instructions for accessing driving environment information that specifies a driving environment of the vehicle, the driving environment information being usable to determine whether the vehicle should be decelerated by executing the automatic shift control;
    instructions for determining whether the vehicle should be decelerated based on the accessed driving environment information;
    instructions for specifying an actual fuel consumption of the vehicle for a particular travel segment;
    instructions for, when it is determined that the vehicle (1) is not being decelerated while traveling downhill and (2) should be decelerated by executing the automatic shift control:
      performing automatic shift control; and;
      generating guidance indicating that the automatic shift control is being performed because it has been determined that the vehicle should be decelerated; and
    instructions for, when (1) the shift control is not being performed, and (2) it is determined that the vehicle should be decelerated by executing the automatic shift control for the particular road segment:
      estimating a first tentative fuel consumption of the vehicle under the assumption that the shift control was performed in the particular travel segment; and
      generating guidance indicating the specified actual fuel consumption and the estimated first tentative fuel consumption; and
    instructions for causing the generated guidance to be output on a display.

* * * * *